(12) United States Patent
Freking et al.

(10) Patent No.: US 7,496,707 B2
(45) Date of Patent: Feb. 24, 2009

(54) DYNAMICALLY SCALABLE QUEUES FOR PERFORMANCE DRIVEN PCI EXPRESS MEMORY TRAFFIC

(75) Inventors: Ronald E. Freking, Rochester, MN (US); Philip R. Hillier, III, Rochester, MN (US); Curtis C. Wollbrink, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 11/466,142

(22) Filed: Aug. 22, 2006

(65) Prior Publication Data

US 2008/0052441 A1     Feb. 28, 2008

(51) Int. Cl.
*G06F 12/00* (2006.01)
*G06F 13/36* (2006.01)
*G06F 13/00* (2006.01)

(52) U.S. Cl. ............... 710/316; 710/310; 710/56; 711/167; 711/170; 711/171

(58) Field of Classification Search ............ 710/56
See application file for complete search history.

(56) References Cited

U.S. PATENT DOCUMENTS

| | | | | |
|---|---|---|---|---|
| 6,044,418 | A * | 3/2000 | Muller | 710/56 |
| 6,145,061 | A * | 11/2000 | Garcia et al. | 711/154 |
| 7,093,037 | B2 * | 8/2006 | Duckman | 710/52 |
| 7,143,263 | B2 * | 11/2006 | Anand et al. | 711/171 |
| 7,327,749 | B1 * | 2/2008 | Mott | 370/413 |
| 2002/0087758 | A1 * | 7/2002 | Dixon | 710/56 |
| 2005/0086448 | A1 * | 4/2005 | Anand et al. | 711/170 |
| 2005/0240745 | A1 * | 10/2005 | Iyer et al. | 711/167 |
| 2006/0133396 | A1 * | 6/2006 | Shah et al. | 370/412 |
| 2006/0153179 | A1 * | 7/2006 | Ho et al. | 370/386 |
| 2006/0174251 | A1 * | 8/2006 | Pope et al. | 719/318 |
| 2006/0224920 | A1 * | 10/2006 | Rooholamini et al. | 714/25 |

OTHER PUBLICATIONS

PCI Express Base Specification Revision 1.0a, Apr. 15, 2003—3 pages total.*

* cited by examiner

*Primary Examiner*—Paul R Myers
*Assistant Examiner*—Brian T Misiura
(74) *Attorney, Agent, or Firm*—Dillon & Yudell LLP

(57) ABSTRACT

A method, data processing system, and PCI Express protocol for enabling high performance IO data transfers for multiple, different IO configurations, which include variable packet sizes and/or variable/different numbers of transactions on the IO link. PCI Express protocol is enhanced to support utilization of counters and dynamically variable queue sizes. In addition to the standard queue entries, several (or a selected number of) dynamically changeable queue entries are provided/reserved and a dynamic queue modification (DQM) utility is provided within the enhanced PCI Express protocol to monitor ongoing, current data transfer and manage when the size(s) of the queue entries are modified (increased or decreased) based on current data traffic transmitting on the PCI Express IO link. The enhanced PCI Express protocol provides an equilibrium point at which many large data packets are transferred efficiently, while imposing a limit on the number of each size of packets outstanding.

15 Claims, 4 Drawing Sheets

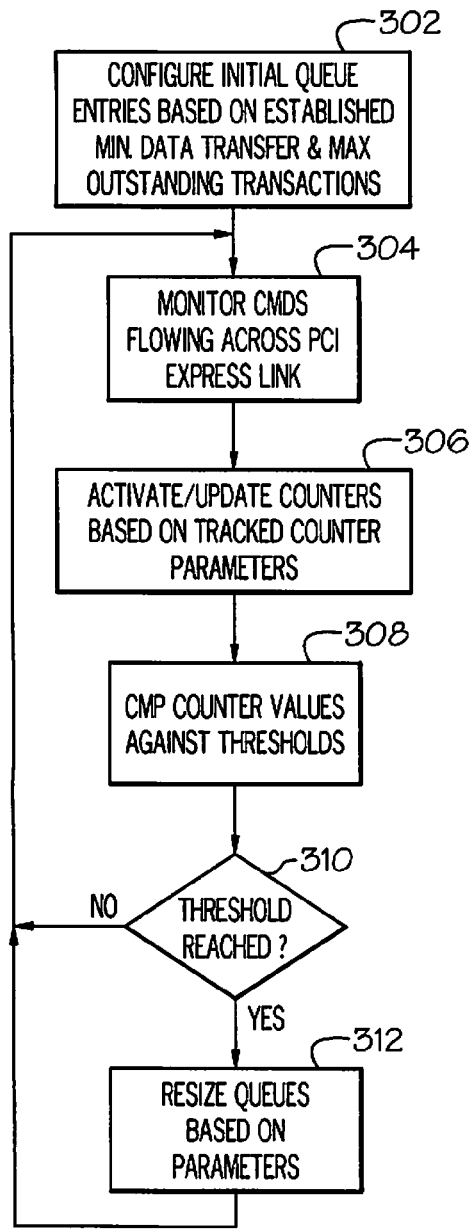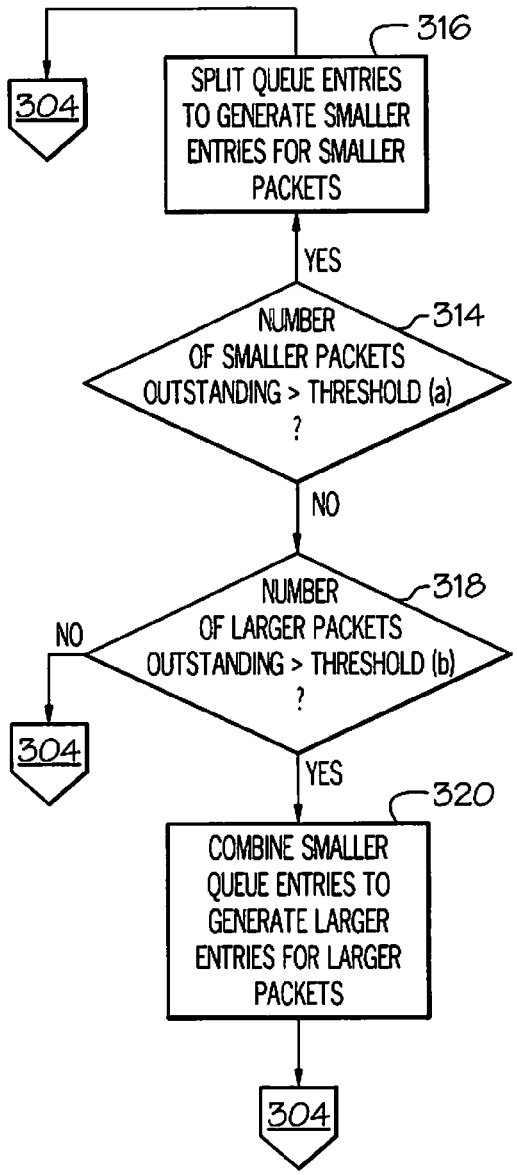
FIG. 3A
FIG. 3B under the page number US 7,496,707 B2

DYNAMICALLY SCALABLE QUEUES FOR PERFORMANCE DRIVEN PCI EXPRESS MEMORY TRAFFIC

BACKGROUND OF THE INVENTION

1. Technical Field

The present invention relates generally to computer systems and in particular to input/output operations of computer systems. Still more particularly, the present invention relates to an enhanced method and system for transferring input/output (IO) data from an IO device of a computer system.

2. Description of the Related Art

Connections of Input/Output (IO) devices to computer systems and the associated transfer of data to and from the connected computer system are typically supported by one of several available hardware devices and associated protocols. In most conventional computer systems, the transfer protocol utilized for local interconnection of these IO devices is Peripheral Component Interconnect (PCI) Express. PCI Express (supported by specific hardware) is an implementation of the PCI computer bus that enables faster physical layer communications via use of a network of serial interconnects (in lieu of a single bus). PCI Express utilizes a single hub with many pins on the mainboard to enable switching and parallel data transfers.

The higher speeds accomplished by PCI Express has enabled PCI express to become the new backplane standard in a majority of personal computers. This is also due in part to PCI Express' design, which enables PCI Express to be completely transparent to software developers. Thus, an operating system designed for PCI is able to boot in a PCI Express system without any code modification.

Conventional methods for enabling IO data transfer include the utilization of IO queues. However, developing queues for IO devices is currently application specific, particularly when transferring data via PCI Express. PCI Express utilizes a variable size packet-driven serial protocol to transfer data A queuing structure is required to execute these transfers in a coherent manner. These IO queues are statically configured and support only a single type of data transfer well. For example, if the IO devices that drive the traffic are varied in (1) the sizes of transfers and/or (2) the number of outstanding transactions on the link, developing the queues becomes a choice of exclusively supporting (a) many large transfers, (b) a few large transfers, (c) many small transfers, or (d) a few small transfers. Each category of data transfer operates best at a particular (single) type of queue configuration and loses operational quality for all other types of transfers and corresponding queue configurations.

The determination of which queue configuration works best for the particular IO transfer depends on what the computer system (or executing application) requests/requires. Thus, when the system/application is concurrently or sequentially providing different combinations of sizes and numbers of transactions, the statically-configured IO queues are unable to deliver high performance on all of the various configurations. The present invention recognizes and corrects this limitation in the existing IO data transfer methods, particularly those that utilize PCI Express.

SUMMARY OF THE INVENTION

Disclosed are a method, data processing system, and PCI Express protocol for enabling high performance IO data transfers for multiple, different IO configurations, which include variable packet sizes and/or variable/different numbers of transactions on the IO link. PCI Express protocol is enhanced to support utilization of counters and dynamically variable queue sizes. In addition to the standard queue entries, several (or a selected number of) dyncamically changeable queue entries are provided/reserved and a dynamic queue modification (DQM) logic is provided within the enhanced PCI Express protocol. The DQM logic monitors ongoing, current data transfer and manages when the size(s) of the queue entries are modified (increased or decreased) based on current data traffic transmitting on the PCI Express IO link.

When data traffic tends towards a single stream of large data packets, queue entries are automatically combined and utilized to transfer the large data as quickly as possible. However, if the data traffic tends towards smaller data packets, the queue entries are broken up into many independent entries to handle the individual, smaller data packets. The enhanced PCI Express protocol provides an equilibrium point at which many large data packets are transferred efficiently, while imposing a limit on the number of each size of packets outstanding.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 3A-3B are flow charts illustrating the processes by which the enhanced PCI Express device and protocol re-configures the IO queues (or queues entries) based on current traffic flow, according to one embodiment of the invention.

DETAILED DESCRIPTION OF AN ILLUSTRATIVE EMBODIMENT

The present invention provides a method, computer system, and PCI Express device/protocol for enabling high performance IO data transfers for multiple, different IO configurations, which include variable packet sizes and/or variable/different numbers of transactions on the IO link. PCI Express protocol is enhanced to support utilization of counters and dynamically variable queue sizes. In addition to the standard queue entries, several (or a selected number of) dynamically changeable queue entries are provided/reserved and a dynamic queue modification (DQM) logic is provided within the enhanced PCI Express protocol. The DQM logic monitors ongoing, current data transfer and manages when the size(s) of the queue entries are modified (increased or decreased) based on current data traffic transmitting on the PCI Express IO link.

When data traffic tends towards a single stream of large data packets, queue entries are automatically combined and utilized to transfer the large data as quickly as possible. However, if the data traffic tends towards smaller data packets, the queue entries are broken up into many independent entries to handle the individual, smaller data packets. The enhanced PCI Express protocol provides an equilibrium point at which many large data packets are transferred efficiently, while imposing a limit on the number of each size of packets outstanding.

Figure 1:
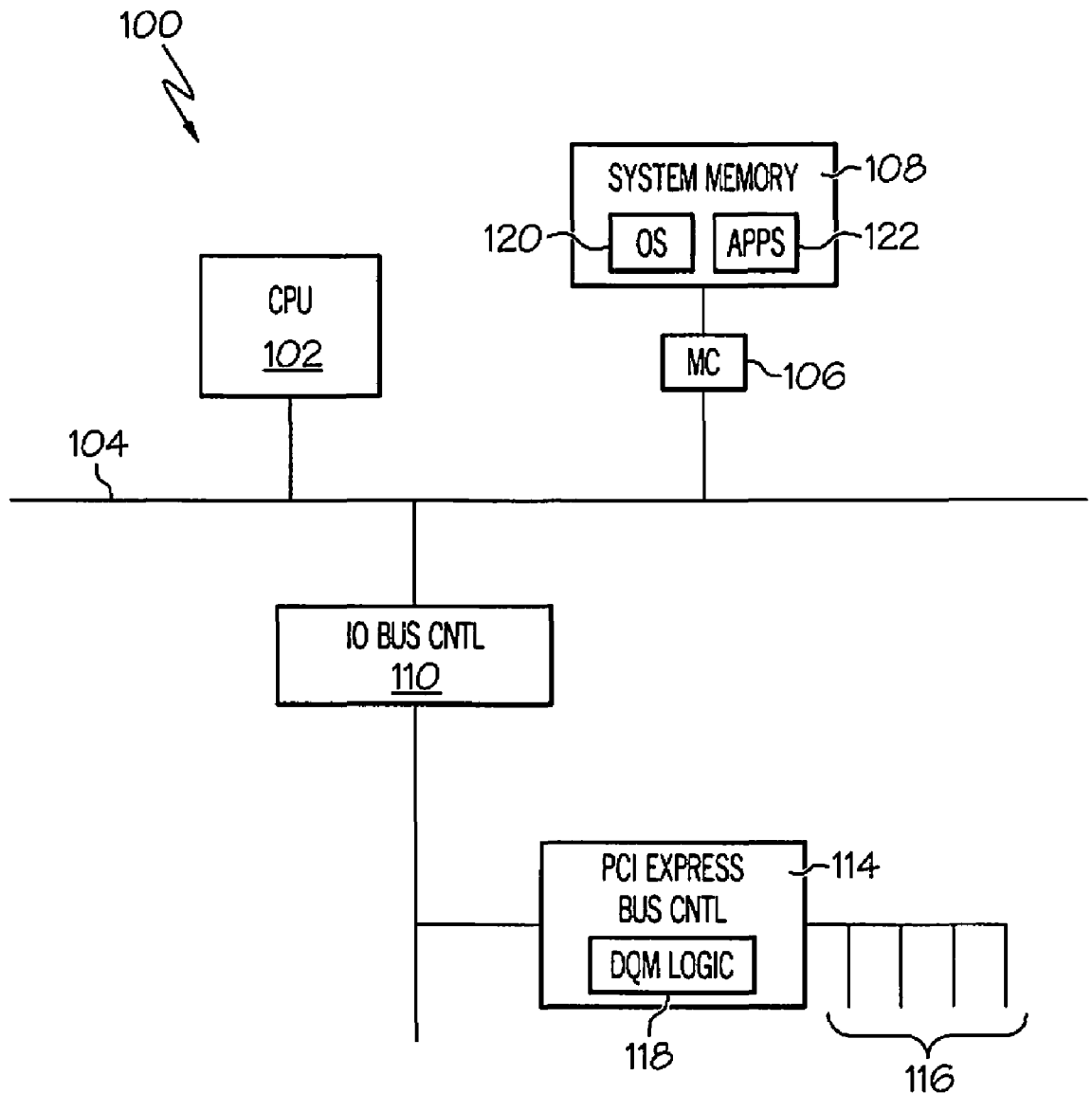
FIG. 1 is a block diagram of a computer system having an enhanced PCI Express devices and protocol for handling variable sized IO traffic utilizing dynamically configurable IO queues according to one embodiment of the invention.

With reference now to the figures, and in particular to FIG. 1, which is a block diagram representation of a data processing system configured with enhanced PCI Express device and associated protocol for completing the dynamic (on-the-fly) size modification of IO queue entries based on current (or existing or received) IO traffic, in accordance with the illustrative embodiment of the present invention. Data processing system 100 comprises at least one central processing unit (CPU) 102 (or processor) connected to a system bus 104. In alternate embodiments, data processing system 100 may be a multiprocessor (MP) system with a plurality of processors. Also connected to system bus 104 is memory controller 106, which provides an interface to system memory 108. I/O bus controller 110 is connected to system bus 104 and provides an interface to I/O bus. Peripheral component interconnect (PCI) Express bus controller 114 is connected to I/O bus and provides an interface to PCI Express local bus 116. PCI Express bus implementation may support four PCI expansion slots or add-in connectors. A number of modems/adapters may be connected to PCI Express local bus 116, enabling communication to IO devices. Existing PCI Express firmware is enhanced with DQM logic 118, which enables the various features of the invention described below.

As provided within the invention, the PC1 Express specification/protocol defines data sizes to be between 1 to 4096 Bytes in length. The transfer of this range of data sizes in a coherent structure requires large packets be broken into manageable chunks. With conventional implementation, if a queue has many entries for small data packets, a large data packet would consume all the queue entries or take a long time to execute when/if one queue entry was utilized to transfer the entire data packet. However, with the invention, the sizes of these queues are variable and depend on the type of traffic actually received (rather then statically configured for the traffic that is expected). Also, the queues are broken into entries that are able to handle the data expected. These entries are either many small entries or a few large entries or a combination of both.

In addition to the above hardware components, various features of the invention may be implemented via software executing on CPU 102. For illustrative purposes, those software components are represented within system memory 108 as operating system (OS) 120 and applications 122. Program code of OS 120 and applications 122 execute on CPU 102 and may generate IO data that is transferred to a PCI connected device (not specifically shown) via PCI bus controller 114. Actual processing/manipulation of data during data transfer from the processor to the PCI device via/through the PCI fabric, as well as processing/manipulation of data received from the connected PCI device utilizing dynamically configurable IO queues is described in detail below.

Figure 2:
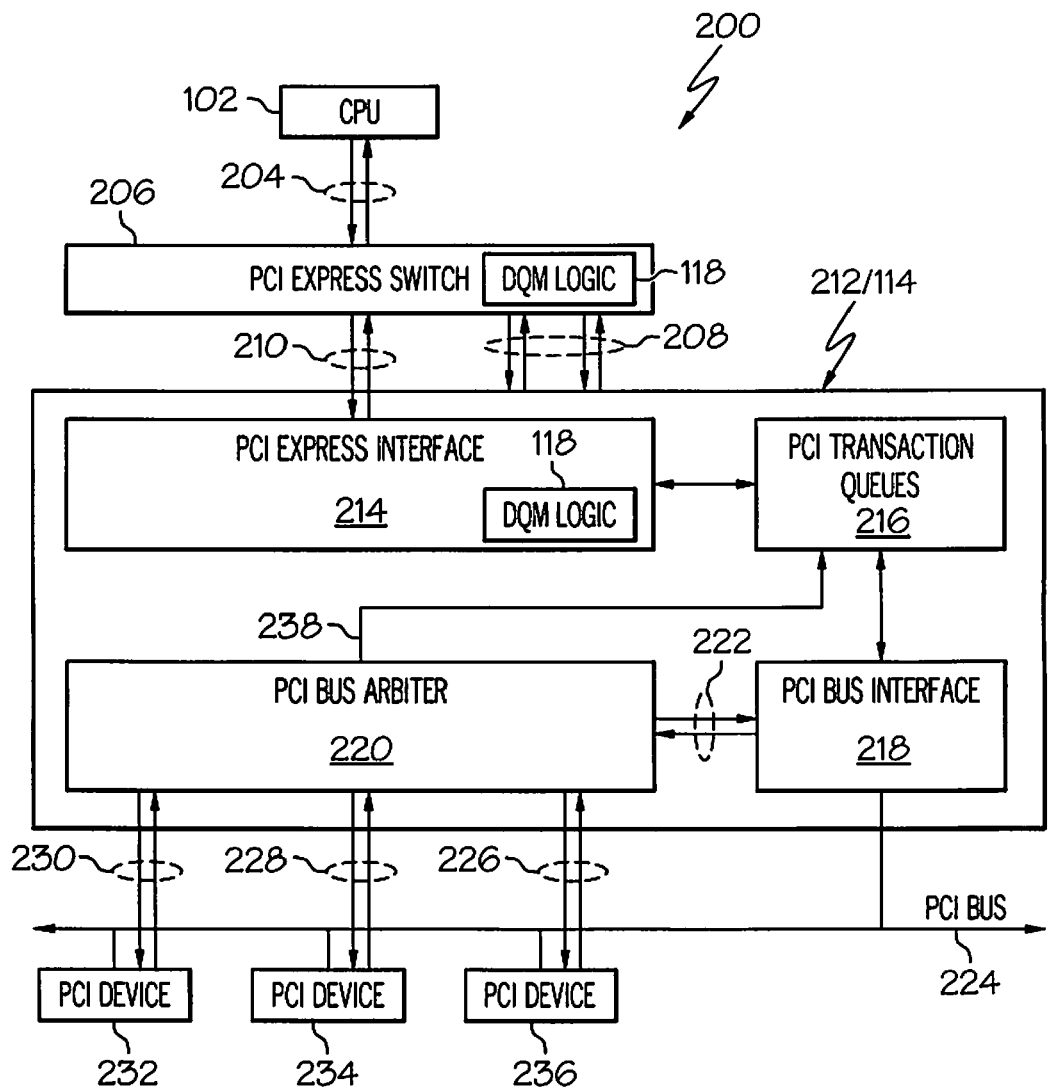
FIG. 2 is a more detailed illustration of a PCI Express subsystem with dynamic queue modification (DQM) logic and dynamically-changeable queues, according to one embodiment of the invention.

FIG. 2 illustrates an IO view of PCI Express subsystem 200 with attached PCI devices, according to one embodiment. PCI express subsystem 200 may be implemented within data processing system 100, and similar components are provided the same reference numerals between the figures. Within this illustration, CPU 102 is coupled to PCI Express switch 206 via first buses 204, and PCI bridge 212 is connected to PCI Express switch 206 via second buses 210. PCI Express switch 206 may be also coupled via third buses 208 to other PCI Express devices or switches (not shown). In the illustrative embodiment, PCI Express switch 206 comprises DQM logic 118, which is utilized to dynamically size PCI Express queues 216. PCI Express switch 206 and PCI bridge 212 may collectively make up PCI Express bus controller 114 of FIG. 1. In alternate embodiments, first buses 204 may also provide DQM functions when first buses are PCI Express buses. Also, as provided in the illustrative embodiment, PCI Express interface 214 also comprises DQM logic 118. The specific location of DQM logic within the general PCI Express bus controller 114 may vary based on system design and it is contemplated that either a single logic or a distributed logic may be utilized within different embodiments of the invention.

PCI bridge 212 is also coupled to PCI bus 116, to which several PCI compliant devices 232, 234, 236 are coupled. Each of these PCI compliant devices 232, 234, 236 has a request/grant pair of buses 230, 228, 226, respectively. The request/grant buses 230, 228, 226 are coupled to PCI bus arbiter 220. PCI bus 116 is coupled to PCI bus interface 218. PCI bus interface 218 is coupled by a two way bus to PCI transaction queues 216. PCI transaction queues 216 are shown in greater details in FIG. 4, which is described below. PCI bus interface 218 is also coupled by request/grant pair of busses 222 to PCI bus arbiter 220. Additional information supplied by PCI bus arbiter 220 and which may be stored with the data in PCI transaction queues 216 is provided to PCI transaction queues 216 along arbiter bus 238. PCI transaction queues 216 are coupled by a two way bus to the PCI Express interface 214, which is coupled to PCI Express switch 206 via second buses 210. PCI Express interface 214 and/or PCI Express switch 206 provide queue entry modification commands from DQM logic 118 to PCI transaction queues 216. While the illustrative embodiment is shown with PCI devices connected to PCI Express, the functional features of the invention are applicable to other types of configurations. Those skilled in the art will appreciate that the illustrative embodiment I provided solely for illustration and not intended to imply any limitations to the applicability of the invention.

In operation, when the slave circuit in PCI bus interface 218 receives the data, the circuit processes the data into the PCI transaction queues. Concurrently, DQM logic 118 performs the necessary operations to modify queue sizes, if required, based on the data characteristics. The process by which the size(s) of the queue entries are modified is described in details below with reference to FIG. 3.

Those of ordinary skill in the art will appreciate that the hardware depicted in FIGS. 1 and 2 may vary. For example, other peripheral devices, such as optical disk drives and the like, also may be used in addition to or in place of the hardware depicted. Thus, the depicted example is not meant to imply architectural limitations with respect to the present invention. The data processing system depicted in FIGS. 1 and 2 may be, for example, an IBM eServer pSeries system, a product of International Business Machines Corporation in Armonk, N.Y., running the Advanced Interactive Executive (AIX) operating system or LINUX operating system.

FIGS. 3A-3B provide flow charts illustrating the operations performed/undertaken during processing of data that is being transferred to and from a PCI (or other) device via PCI Express bus (controller) 114 with associated PCI transaction queues 216. According to the invention, the queues comprise one or more entries that are dynamically configurable, based on the type and number of data being transferred through the PCI fabric.

The number of transactions supported and queue entries provided are finite based on a maximum amount of available space allocated to the queues. In the exemplary embodiment, the maximum size single queue supported contains a single queue entry of 2096 bytes, and the queue is capable of supporting up to 32 entries at 64 bytes each. Also, in the described embodiment, the queue entries are sized at 512 bytes each, resulting in only four (4) queue entries being available during system initialization (device power on or setup).

Processing of the inventive steps is completed via DQM logic 118 once the initial parameters are established. According to the invention, DQM logic 118 comprises one or more performance counters, which take on one of several pre-defined characteristics based on the number of outstanding transactions (NTR). To understand the processing completed by the utility, the following parameters are defined and utilized within the example DQM logic 118:

| | |
|---|---|
| NTR | Number of transactions |
| N64 | Number of transactions between 0B and 64B |
| N256 | Number of transactions between 64B and 256B |
| N512 | Number of transactions between 256B and 512B |
| Nxxx | Number of transactions (up to Max Payload) |
| RLT | Reset Limit |
| RLEn | Reset Once |
| P(1-6)% | Percent used in "If" statements (1-6), where six different threshold percentages are established and utilized to determine when to modify a queue entry |

Parameter NTR is reset after reaching the reset limit (RLT). In the specific illustrative embodiment, when NTR reaches RLT, an evaluation of queue entry sizes is completed by DQM logic 118. This evaluation may occur only once if RLEn is set to "on" (e.g., the value of RLEn=1). However, when RLEn is not set to "on," (e.g., the value of RLEn=0), the evaluation of queue entry sizes is triggered and completed every time NTR reaches RLT. DQM logic 118 performs the consolidation or expansion of queue entries within queues 216 based on a series of conditions, which are presented below. Each condition includes a determination of the number of outstanding transactions, where P(x)% is the maximum threshold percentage for that particular number of transactions to trigger the resize operation. Thus:
  (a) If N64 is greater than P1% of NTR, set the queues to 64B entries;
  (b) If N256 is greater than P2% of NTR, set the queues to 256B entries;
  (c) If N512 is greater than P3% of NTR, set the queues to 512B entries;
  (d) If N64+N512 is greater than P4% of NTR set the queues to 256B;
  (e) If N256+N512 is greater than P5% or NTR set queues to 256B;
  (f) If N256+N64 is greater than P6% of NTR set queues to 128B; and
  (g) If none of the above proves to be true, the utility leaves the queues in the current configuration.

Figure 4:
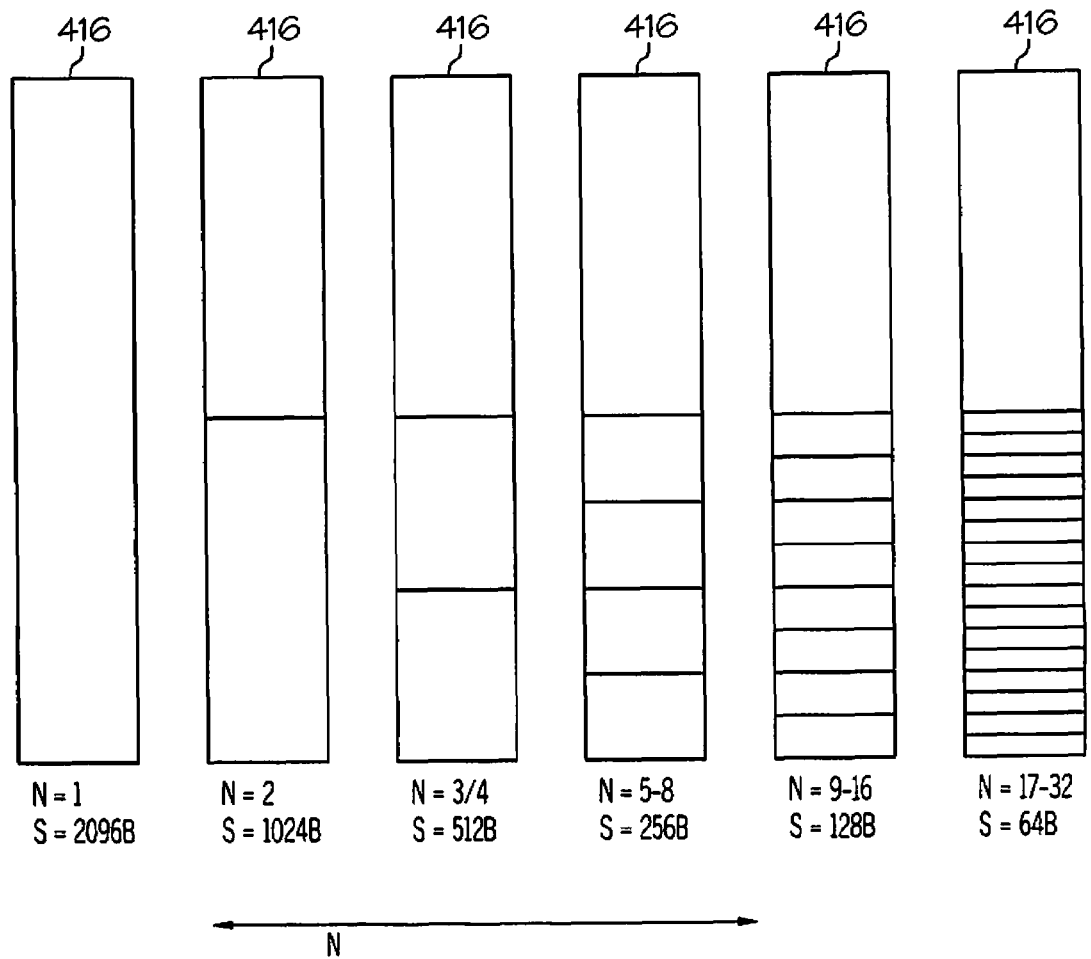
FIG. 4 illustrates an example sequence of dynamically configurable IO queue entries with a maximum queue size and variable numbers of queue entries, according to one embodiment of the invention.

FIG. 4 illustrates example queue entry sizes within a singe queue 416 In the illustration, the queue entry sizes are based on the maximum queue size (e.g., 2096B) and the number of outstanding data of a particular size (requiring a specific size entry). Only those queues that are designated as changeable are affected by DQM logic 118, and the number of queues designated as changeable may be a design parameter or a programmable parameter based on the executing application (s). Thus, some of the available queues may contain entries with preset sizes tat are not changed by the processes of DQM logic 118. Returning to the figure, each entry within the set of queue entries (from the leftmost queue 416 proceeding sequentially to the rightmost queue 416 is divided down by a factor of two as the size of the data (data packets) decreases. Also, the illustrative embodiment indicates that the entire queue 416 is not necessarily divided into equal pans, thus allowing for both smaller packets and larger packets to be queued within a single queue 416.

Turning now to FIG. 3A, the process begins at block 302 at which the queues (and queue entries) are initially configured with a default queue size based on the minimum data transfer and the maximum outstanding transactions that may be handled by the queue. These parameters may be preset or determined during activation of the PCI Express IO devices and/or applications accessing the IO devices. DQM logic 118 monitors for commands to begin flowing across the PCI express link, as shown at block 304, and as commands begin flowing across the PCI express link, DQM logic 118 activates a series of counters (or counter mechanism) to track specific counter parameters, as indicated at block 306. According to the illustrative embodiment, the counter is utilized to keep track of (a) the number of transactions outstanding at one time, (b) the average size of transactions, and (c) the number of queue entries available (hereinafter collectively referred to as the "counter tracking parameters").

At block 308, the counter values are compared to a set of pre-established threshold values (one for each counter), and a determination is made at block 310 whether the counter values have reach the associated threshold. If any one of the counter values have reached the associated threshold, DQM logic 118 initiates a resizing of the queue entries to accommodate for that particular sized data packet, as shown by block 312.

FIG. 3B depicts a more detailed evaluation performed by DQM logic 118 in determining whether to reduce or enlarge the size of the queue entries. This determination begins at block 314, at which DQM logic 118 checks whether there are a greater number of smaller data packets outstanding than the associated threshold for that size packet. When there is a greater number of outstanding smaller data packets than the associated threshold, DQM logic 118 splits the queue entries, as shown at block 316, to generate smaller queue entries to accommodate a larger number of smaller data packets. For example, if there are four data packets outstanding and the sizes of the packets are 256 bytes or less, DQM logic 118 splits the initial four queue entries (originally 512B each) into 8 entries at 256 bytes, as shown. DQM logic 118 thus divides down the queue to a maximum number of entries that has been defined. In one embodiment, a maximum number of entries may be established to drive the determination.

Returning to decision block 314, if DQM logic 118 determines that the number of smaller data packets outstanding is not greater than the associated threshold for that size packet, DQM logic 118 checks, as depicted at block 318, whether there are a greater number of larger data packets outstanding than the associated threshold for that size packet. When there is a greater number of outstanding larger data packets than the associated threshold, DQM logic 118 combines or consolidates two or more or the queue entries, as shown at block 320, to generate larger queue entries to accommodate a greater number of larger data packets. For example, assuming there are four queue entries having an initial 512 byte capacity and there are only two large data transfers outstanding at a time, DQM logic 118 consolidates the queue to two (2) entries at 1024 bytes each. The performance counters are thus utilized to show trends in the data traffic, and DQM logic 118 is eventually able to change the queue sizes based on the performance counters in order to gain better performance in different IO data transfer situations. The monitoring and resizing of queue entries continues for additional data traffic received as indicated by the return to block 304 from each end point of the sub-process.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, thumb drives, hard disk drives, CD ROMs, DVDs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:
    a processor coupled to a system bus;
    a computer expansion bus controller coupled to the system bus and which supports a peripheral component interconnect (PCI) enabled fabric for routing data packets to and from the system bus and devices coupled to the PCI enabled fabric, wherein said computer expansion bus controller is a PCI Express bus controller and includes:
    at least one PCI queue having one or more queue entries that that are dynamically configurable to accommodate a plurality of different sized data packets scheduled to be transferred through the PCI fabric; and
    a PCI Express firmware that includes dynamic queue modification (DQM) logic, which dynamically modifies a size of said one or more queue entries to accommodate an existing type, number and size of data packets that are being scheduled for transfer through the PCI fabric, wherein said DQM logic further comprises:
        logic for establishing thresholds associated with each size of data packets for triggering when to modify the size of the queue entries to that corresponding to the particular size of data packets, wherein said threshold establishes a number above which the number of outstanding data rackets of the corresponding size should be reduced;
        logic for comparing a current number of outstanding data packets of each size against the threshold corresponding to that size data packet; and
        logic for resetting a counter when the counter reaches a preset limit;
        logic for tracking a percentage of transactions within each of said pre-specified ranges of transaction sizes that is currently outstanding and waiting to be transferred within the PCI fabric, wherein when a percentage of existing transactions passes a preset threshold, said DQM logic triggers said dynamic configuration of the queue entries to support a transfer of more transactions within that range of specific transaction size;
        logic for consolidating and expanding queue entries within the queue based on the tracked percentage of transactions within each of the pre-specified ranges of transaction sizes; and
        logic for adjusting the rate at which a size of a queue entry is modified based on an analysis of the current traffic relative to a pre-established equilibrium point that balances (a) efficient transfer of a number of larger data rackets with (b) limiting a number of each size of data packets outstanding to below the preset thresholds of the specific size of data packets one or more performance counters, which take on one of several predefined characteristics based on the number of outstanding transactions (NTR), wherein said counters are utilized to track a number of received transactions in each of multiple pre-specified ranges of transaction size.

2. The data processing system of claim 1, wherein said DQM logic comprises logic for:
    initially configuring each queue entry within the queue to a default queue size, said default queue size based on a minimum data transfer and a maximum number of outstanding transactions that may be handled by the queue;
    monitoring for transactions flowing across the PCI express fabric;
    activating and updating a series of counters to track specific counter parameters from among (a) the number of transactions outstanding at one time, (b) the average size of transactions, and (c) the number of queue entries available;
    comparing counter values to a set of pre-established threshold values; and
    when one of the counter values has reached the corresponding, pre-established threshold, initiating a resizing of the queue entries to accommodate a larger number of transaction packets corresponding to the threshold value.

3. The data processing system of claim 1, further comprising:
    logic for enabling input/output (IO) data transfers with multiple, different IO data packet characteristics and configurations from among (a) variable, different sizes of data packets and (b) variable numbers of data packets of each size waiting to be scheduled for transfer through the PCI fabric;
    wherein said PCI Express firmware comprises a plurality of counters, including a first set of counters, which each track a number of queue entries of a particular size and a second set of counters which each track a number of outstanding data packets of each different size supported by the PCI fabric.

4. The data processing system of claim 1, wherein said PCI Express bus controller comprises:
    multiple queues with at least a first static queue having a static number of queue entries of a particular size and at least a second dynamically configurable queue wit a variable number of dynamically changeable queue entries that are modified in real time by the DQM logic; and
    said DQM logic completes the functions of (a) monitoring ongoing, current data transfer; (b) triggering a modification of a size of each queue entry based on current number of outstanding data traffic waiting to be transferred over the PCI fabric.

5. The data processing system of claim 1, where said DQM logic further comprising logic for:

determining a current trend within ongoing data traffic, said trend including a first condition in which a predetermined threshold portion of the ongoing traffic contains a single stream of a large data packet, a second condition in which a second predetermined threshold portion of the ongoing traffic contains multiple streams of smaller data packets, and one or more other conditions in which a different threshold number of streams of a third different sized packets are present within the ongoing traffic, where the third different size is a size in between the smaller data packets and the larger data packers;

when the trend is that of a single stream of large data packets, automatically combining smaller queue entries into larger entries to support efficient transfer of the larger data packets across the PCI fabric; and when the trend is that of multiple streams of smaller data packets, automatically breaking larger queue entries into smaller independent entries to support efficient transfer of the individual, smaller data packets.

6. The data processing system of claim 1, wherein said DQM logic further comprises logic for:

determining whether there are a greater number of smaller data packets outstanding than the associated threshold for that size packet;

when there is a greater number of outstanding smaller data packets than the corresponding, pre-established threshold, splitting larger queue entries to generate smaller queue entries that accommodate a larger number of smaller data packets;

determining whether there are a greater number of larger data packets outstanding than the associated threshold for the larger data packets; and when there is a greater number of outstanding larger data packets than the associated threshold, combining two or more of the existing queue entries to generate larger queue entries to accommodate a greater number of larger data packets.

7. The data processing system of claim 1, further comprising:

an input/output (I/O) bus controller connected to the system bus and providing an I/O bus, wherein said PCI Express bus controller is coupled to the I/O bus and provides an interface to a PCI Express local bus; and wherein said PCI Express bus controller further comprises a PCI Express switch, a PCI Express interface, and PCI Express buses, wherein said DQM logic is within one or more of the PCI Express switch, the PCI Express interface, and the PCI Express buses.

8. In a data processing system having a processor coupled to a system bus and a peripheral component interconnect (PCI) enabled fabric, which includes a computer expansion bus controller coupled to the system bus, said computer expansion bus controller having the functionality of a PCI express bus controller having one or more PCI queues with one or more queue entries and a dynamic queue modification (DQM) logic, a method for managing transfer of data packets across the PCI enabled fabric, said method comprising:

monitoring ongoing, current data transfer within the PCI fabric;

wherein said monitoring comprises determining a current trend within ongoing data traffic, said trend including a first condition in which a pre-determined threshold portion of the ongoing traffic contains a single stream of a large data packet, a second condition in which a second determined threshold portion of the ongoing traffic contains multiple streams of smaller data packets, and one or more other conditions in which a different threshold number of streams of a third different sized packets are present within the ongoing traffic, where the third different size is a size in between the smaller data packets and the larger data packers; and triggering a dynamic modification of a size of each queue entry based on current data traffic transmitting on the PCI fabric, wherein said dynamic modification is completed via the DQM logic; and wherein said triggering comprises:

when the trend is that of a single stream of large data packets, automatically combining smaller queue entries into larger entries to support efficient transfer of the larger data packets across the PCI fabric; and when the trend is that of multiple streams of smaller data packets, automatically breaking larger queue entries into smaller independent entries to support efficient transfer of the individual, smaller data packets.

9. The method of claim 8, wherein said DQM logic includes one or more performance counters, which take on one of several predefined characteristics based on the number of outstanding transactions (NTR), wherein said counters are utilized to track a number of received transactions in, a pre-specified ranges of transaction size, said method further comprising:

resetting a counter when the counter reaches a preset limit;

tracking a percentage of transactions within each of said pre-specified ranges of transaction sizes that is currently outstanding and waiting to be transferred within the PCI fabric, wherein when a percentage of existing transactions passes a preset threshold, said DQM logic triggers said dynamic configuration of the queue entries to support a transfer of more transactions within that range of specific transaction size; and consolidating and expanding queue entries within the queue based on the tracked percentage of transactions within each of the pre-specified ranges of transaction sizes.

10. The method of claim 8, further comprising:

initially configuring each queue entry within the queue to a default queue size, said default queue size based on a minimum data transfer and a maximum number of outstanding transactions that may be handled by the queue;

monitoring for transactions flowing across the PCI express fabric;

activating and updating a series of counters to track specific counter parameters from among (a) the number of transactions outstanding at one time, (b) the average size of transactions, and (c) the number of queue entries available;

comparing counter values to a set of pro-established threshold values; and when one of the counter values has reach the corresponding, pro-established threshold, initiating a resizing of the queue entries to accommodate a larger number of transaction packets corresponding to the threshold value.

11. The method of claim 8, wherein the DQM utility further comprises:

logic for enabling input/output (IO) data transfers with multiple, different IO data packet characteristics and configurations from among (a) variable, different sizes of data packets and (b) variable numbers of data packets of each size waiting to be schedule for transfer through the PCI fabric; and a plurality of counters, including a first set of counters, which each track a number of queue entries of a particular size and a second set of counters which each track a number of outstanding data packets of each different size supported by the PCI fabric.

12. The method of claim 8, wherein:

the PCI Express bus controller of the data processing system comprises multiple queues with at least a first static queue having a static number of queue entries of a particular size and at least a second dynamically configurable queue with a variable number of dynamically changeable queue entries that are modified in real time by the DQM logic; and said method comprises (a) monitoring ongoing, current data transfer; and (b) triggering a modification of a size of each queue entry based on current number of outstanding data traffic waiting to be transferred over the PCI fabric.

13. The method of claim 8, further comprising:

establishing thresholds associated with each size of data packets for triggering when to modify the size of the queue entries to that corresponding to the particular size of data packets, wherein said threshold establishes a number above which the number of outstanding data packets of the corresponding size should be reduced;

comparing a current number of outstanding data packets of each size against the threshold corresponding to that size data packet; and adjusting the rate at which a size of a queue entry is modified based on an analysis of the current traffic relative to a pre-established equilibrium point that balances (a) efficient transfer of a number of larger data packets with (b) limiting a number of each size of data packets outstanding to below the preset thresholds of the specific size of data packets.

14. The method of claim 8, further comprising:

determining whether there are a greater number of smaller data packets outstanding than the associated threshold for that size packet;

when there is a greater number of outstanding smaller data packets than the corresponding, pre-established threshold, splitting larger queue entries to generate smaller queue entries that accommodate a larger number of smaller data packets;

determining whether there are a greater number of larger data packets outstanding than the associated threshold for the larger data packets; and when there is a greater number of outstanding larger data packets than the associated threshold, combining two or more or the existing queue entries to generate larger queue entries to accommodate a greater number of larger data packets.

15. The method of claim 8, wherein said data processing system further comprises:

an input/output (I/O) bus controller connected to the system bus and providing an I/O bus, wherein said PCI Express bus controller is coupled to the I/O bus and provides an interface to a PCI Express local bus; and wherein said PCI Express bus controller further comprises a PCI Express switch, a PCI Express interface, and PCI Express buses, wherein said DQM logic is within one or more of the PCI Express switch, the PCI Express interface, and the PCI Express buses.

* * * * *